United States Patent
Mercier et al.

(10) Patent No.: US 8,586,661 B2
(45) Date of Patent: Nov. 19, 2013

(54) SURFACE COVERING MATERIALS AND PRODUCTS

(75) Inventors: Jean-Claude Mercier, Sherbrooke (CA); Stéphane Fitzback, Sherbrooke (CA)

(73) Assignee: American Biltrite (Canada), Ltd., Sherbrooke, Quebec (CA)

( * ) Notice: Subject to any disclaimer, the term of this patent is extended or adjusted under 35 U.S.C. 154(b) by 0 days.

(21) Appl. No.: 13/458,724

(22) Filed: Apr. 27, 2012

(65) Prior Publication Data

US 2012/0277365 A1    Nov. 1, 2012

Related U.S. Application Data

(60) Provisional application No. 61/480,669, filed on Apr. 29, 2011.

(51) Int. Cl.
*C08K 3/26* (2006.01)

(52) U.S. Cl.
USPC ........... 524/426; 525/240; 525/242; 525/274; 524/443

(58) Field of Classification Search
USPC ................... 524/426, 443; 525/240, 242, 274
See application file for complete search history.

(56) References Cited

U.S. PATENT DOCUMENTS

2008/0146737 A1    6/2008    Ashiura et al.

FOREIGN PATENT DOCUMENTS

| CA | 2155625 | A1 | | 8/1995 |
|---|---|---|---|---|
| CA | 2155325 | | * | 3/1996 |
| CA | 2220668 | A1 | | 1/1997 |
| CA | 1339286 | C | | 8/1997 |
| CA | 2520393 | | * | 10/2004 |
| CA | 2520393 | A1 | | 10/2004 |
| JP | 2240149 | | | 9/1990 |

OTHER PUBLICATIONS

International Search Report for PCT/CA2012/050261, dated Jul. 23, 2012, 4 pages.
Written Opinion for PCT/CA2012/050261, dated Jul. 23, 2012, 6 pages.

* cited by examiner

*Primary Examiner* — Robert D. Harlan

(74) *Attorney, Agent, or Firm* — Choate, Hall & Stewart LLP; Brenda H. Jarrell; Daniel S. Matthews

(57) ABSTRACT

In various embodiments, the present inventions provide a heat and color stable flooring materials/product comprising between about 1 wt % to about 50 wt % a polyolefin-based elastomer material; between about 2 wt % to about 50 wt % a polyolefin-based thermoplastic material; between about 20 wt % to about 75 wt % a filler; and between about 0.25 wt % to about 5 wt % a curing system containing a peroxide. Also provided in various embodiments are method of making and using such a flooring material/product.

20 Claims, No Drawings

SURFACE COVERING MATERIALS AND PRODUCTS

CROSS-REFERENCE TO RELATED APPLICATIONS

This application claims priority to U.S. provisional patent application Ser. No. 61/480,669, filed Apr. 29, 2011, the entire contents of which are herein incorporated by reference.

BACKGROUND OF THE INVENTION

Rubber flooring products are usually made from sulphur cured SBR (Styrene-Butadiene Rubber) and are not heat stable at processing and curing temperatures; this yields to discoloration and makes it difficult to control color shading within the same production run, and also from run to run. Flooring products made from NR (Natural Rubber) or NBR (Nitrile-Butadiene Rubber), or a blend thereof, suffer from similar problems. These problems present major issues for flooring products because aesthetic attributes can be as important to customers as are physical attributes.

A standard formula for a traditional rubber flooring product is as follows:
Rubber (SBR, NR, NBR, or a blend of): 20-50%
Fillers (clay, silica, limestone, or a blend of): 40-70%
Plasticizer/Resin: 2-10%
Vulcanisation package: 2-10%

SUMMARY OF THE INVENTION

The invention, in some embodiments, concerns a new formula for making rubber surface covering (e.g., flooring) material, for example prepared in tile or sheet form, that is stable under normal processing and curing temperatures (e.g., so that it does not change color during manufacturing or after installation). In some embodiments, the provided flooring material is used as or in a finished flooring product that is more stable than traditional flooring products. In some embodiments, provided flooring material and/or product substantially maintains its color over time after installation. In some embodiments, provided flooring material and/or product shows one or more improved physical features as compared with traditional flooring products. In some embodiments, such physical features include one or more of flexibility, abrasion, indent resistance, and combinations thereof.

Among other things, the inventive ability to provide flooring materials and/or products that substantially maintain their color permits preparation and/or use of flooring materials and/or products of lighter, brighter and/or crisper colors than are typically prepared and/or used with traditional rubber flooring materials and/or products. For example, in some embodiments, rubber flooring materials and/or products that contain elements of colors selected from the group consisting of colorants, pigments, strips and chips of color are provided.

Among other things, the present invention provides a flooring material comprising between about 1 wt % and about 50 wt % a polyolefin-based elastomer material, between about 2 wt % and about 50 wt % a polyolefin-based thermoplastic material, between about 20 wt % and about 75 wt % a filler and between about 0.25 wt % and about 5 wt % a peroxide curing system.

In some embodiments, provided flooring materials show better heat resistance and/or color retention than observed with one or more traditional rubber flooring materials.

In some embodiments, the invention provides flooring materials and/or products that utilize a polyolefin-based elastomer selected from the group consisting of:
Ethylene-Propylene Rubber (EPR)
Ethylene-Propylene-Diene Rubber (EPDM)
High Styrene-Butadiene copolymer
Ethylene-Acrylic Rubber (e.g., Vamac)
Butyl Rubber (IIR) and
combinations thereof.

In some embodiments, the invention provides flooring materials and/or products that utilize a polyolefin-based thermoplastic selected from the group consisting of:
Polyethylene (LDPE, LLDPE, ULDPE, etc.)
Ionomer
Acid copolymer (E/MMAA, E/MAA)
Acrylate copolymer (MA, MMA, BMA/MMA)
Ethylene-Octene copolymer
Styrene-Acrylate copolymer
Styrene-methylacrylate block copolymer
Styrene-polyolefin block copolymer; and
combinations thereof Among other things, the present invention demonstrates that EPR and/or EPDM show particularly useful heat stability characteristics at curing temperatures when utilized in provided flooring materials and/or products.

Among other things, the present invention demonstrates that ionomers show particularly useful scratch, abrasion and/or indent resistance characteristics when utilized in provided flooring materials and/or products.

Among other things, the present invention demonstrates that provided flooring materials and/or products including high styrene copolymer, methyl acrylate copolymers and/or acrylic acid copolymers may show improved and/or otherwise desirable characteristics, particularly with respect to processability and adhesion.

In some embodiments, provided flooring materials and/or products utilizing one or more fillers selected from the group consisting of, limestone, silica, clay, zinc oxide, mica, baryte, dolomite, alumina trihydrate and combinations thereof. In some embodiments, fillers may additionally include silica; in some such embodiments, provided flooring materials and/or products demonstrate improved abrasion resistance characteristics. Alternatively or additionally, in some embodiments, fillers may include alumina trihydrate; in some such embodiments, provided flooring materials and/or products show fire resistance characteristics.

In some embodiments, the present invention utilizes peroxide curing, for example rather than a conventional sulphur curing system. In some embodiments, a provided cured flooring product shows improved heat resistance as compared with a sulphur cured product. In some embodiments, improved heat resistance contributes to reduced color shading and/or improved color stability, for example during processing and/or curing and/or installation.

In some embodiments, a flooring material and/or product according to the present invention is prepared by mixing raw materials together, for example in a Banbury mixer. The resulting compound is then processed through a calender or a roller-head extruder; the sheet can be homogeneous in color, or marbleized through the addition of strips of one or many contrasting colors, or chip decorated through the addition of uncured or cured chips of same or different formula. The resulting sheet can be cured, for example, on a continuous curing press, or cut in slabs of specific dimensions, and molded in compression presses.

DETAILED DESCRIPTION OF VARIOUS EMBODIMENTS

The present inventions provide compositions of surface covering (e.g., flooring) materials and their products, as well as methods of making and using thereof. Such surface covering materials in general can be used to cover any surface with suitable properties. In some embodiments, a flooring material is particularly useful.

In various embodiments, a flooring material or its flooring product includes at least a polyolefin-based elastomer material, a polyolefin-based thermoplastic material, one or more suitable fillers and a peroxide curing system capable of causing interlinking reactions to take place when the materials is cured. In some embodiments, a peroxide curing system includes a peroxide. In some embodiments, a peroxide curing system includes a peroxide and a coagent.

In various embodiments, the present invention provides a flooring product prepared from a flooring material, for example, by curing using a peroxide curing system. Such a flooring product, in addition to a curing system, includes at least a polyolefin-based elastomer material, a polyolefin-based thermoplastic material, and one or more suitable fillers.

In other aspects, the present invention provides methods of preparing a floor product. In some embodiments, methods include mixing a polyolefin-based elastomer material, a polyolefin-based thermoplastic material, one or more suitable fillers and a peroxide curing system into a flooring material, and curing the flooring material to produce a flooring product. In some embodiments, methods including combining such a flooring material or its flooring product with a color package.

In other aspects, the present invention provides methods of using such a flooring material and/or its flooring product.

Compositions

Polyolefin-Based Elastomer Materials

An elastomer, in general, is a polymer with the property of viscoelasticity. In some embodiments, an elastomer material used in accordance with the present invention is polyolefin-based.

The term "polyolefin-based" as used herein in a broad sense refers to any materials that contain polyolefin, which can be homopolymer, copolymer, or any modified polymer. Exemplary polyolefin-based elastomer materials include, but no limits to, ethylene-propylene rubber (EPR), ethylene-propylene-diene rubber (EPDM), ethylene-acrylic rubber such as Vamac®, and their copolymer or modified version with each other or any others. In some embodiment, an elastomer material may include high styrene-butadiene copolymer.

In accordance with the present invention, a polyolefin-based elastomer material, in some embodiments, is in a range of about 1 wt % to about 50 wt % of a floor material before curing or its flooring product. In some embodiments, a polyolefin-based elastomer material is in a range of about 5 wt % to about 50 wt %. In some embodiments, a polyolefin-based elastomer material is in a range of about 5 wt % to about 25 wt %. In some embodiments, a polyolefin-based elastomer material is in a range of about 5 wt % to about 15 wt %. In some embodiments, a polyolefin-based elastomer material is about 0.5 wt %, about 1 wt %, about 2 wt %, about 5 wt %, about 10 wt %, about 15 wt %, about 20 wt %, about 25 wt %, about 30 wt %, about 35 wt %, about 40 wt %, about 45 wt % and about 50 wt %. In some embodiments, a polyolefin-based elastomer material is in a range of any two of the above values.

In some embodiments, provided flooring material or its flooring product contains a high styrene resin in a range of about 0 wt % to about 10 wt %. In some embodiments, a high styrene resin is in a range of about 0 wt % to about 6 wt %. In some embodiments, a high styrene resin is in a range of about 1 wt % to about 5 wt %. In some embodiments, a high styrene resin is in a range of about 2 wt % to about 5 wt %. In some embodiments, a high styrene resin is in a range of about 3 wt % to about 5 wt %. In some embodiments, a high styrene resin is in a range of about 3 wt % to about 6 wt %. In some embodiments, a high styrene resin is in a range of about 0 wt % to about 2 wt %. In some embodiments, a high styrene resin is in a range of about 0 wt % to about 1 wt %. In some embodiments, a high styrene resin is about 4 wt %. In some embodiments, provided flooring materials contain no high styrene resin.

Polyolefin-Based Thermoplastic Materials

A thermoplastic is a polymer that melts when heated and freezes to a very glassy state when cooled sufficiently. In some embodiments, a thermoplastic material used in accordance with the present invention is polyolefin-based. Exemplary polyolefin-based thermoplastic materials include, but no limits to, polyethylene (e.g., polyethylene (LDPE; HDPE, etc.); polypropylene; ionomer; acid copolymers such as ethylene-methacrylic acid (E/MAA) and ethylene-methyl methacrylate acid (E/MMAA); acrylate copolymer such as methyl acrylate (MA), methyl methacrylate (MMA), and butyl methacrylate/methyl methacrylate (BMA/MMA); ethylene-octene copolymer; styrene-acrylate copolymer; styrene-methylacrylate block copolymer; and styrene-polyolefin block copolymer; and their copolymer or modified version with each other or any others.

In some embodiments, a thermoplastic material is an ionomer. An ionomer, in general, is defined as a polymer in which there is a small, but significant, proportion of constituent monomers which have ionic groups. The term ionomer, as used herein, refers to a polymer which contains partially ionized carboxylate moieties and their associated counterions. In some embodiments, an ionomer is a polyolefin-based ionomer.

Exemplary ionomers include, but are not limited to, copolymer or terpolymer which contains between 5% and 25% of partially neutralized carboxylate moieties, between 0% and 30% of acrylate and between 45% and 95% of ethylene. In some embodiments, an ionomer contains between 5% and 15% of carboxylate moieties, between 5% and 15% of acrylate and between 75% to 90% of ethylene. Constituent monomers which contain carboxylate moieties can include, but are not limited to, methacrylic acid (MAA) and ethylene acrylic acid (EAA). Exemplary neutralized carboxylate moieties counterions include, but are not limited to, any ionic metal of valance 1 to 3 such as aluminum, lithium, sodium and zinc. In certain embodiments, a zinc counterion is of use. Exemplary acrylate constituent monomers include, but are not limited to, methyl acrylate (MA), methyl methacrylate (MMA), ethyl acrylate (EA), ethyl methacrylate (EMA), butyl acrylate and butyl methacrylate (BuMA). In certain embodiments, isobutyl methacrylate (iBuMA) is of use. Exemplary commercial polymer brands suitable for use in the present invention include SURLYN from DuPont and IOTEK from ExxonMobil Chemicals. In some embodiments, SURLYN products (e.g., SURLYN 9020 and 9320) are useful for the present invention.

In accordance with the present invention, a polyolefin-based thermoplastic material, in some embodiments, is in a range of about 2 wt % to about 50 wt % of a floor material before curing or its flooring product. In some embodiments, a polyolefin-based thermoplastic material is in a range of about 2 wt % to about 25 wt %. In some embodiments, a polyolefin-based thermoplastic material is in a range of about 2 wt % to about 15 wt %. In some embodiments, a polyolefin-based thermoplastic material is as low as about 4 wt %. In some embodiments, a polyolefin-based thermoplastic material is about 1 wt %, about 2 wt %, about 4 wt %, about 5 wt %, about 10 wt %, about 15 wt %, about 20 wt %, about 25 wt %, about 30 wt %, about 35 wt %, about 40 wt %, about 45 wt % and about 50 wt %. In some embodiments, a polyolefin-based thermoplastic material is in a range of any two of the above values.

In some embodiments, a polyolefin-based thermoplastic material comprises an ionomer in a range of about 2 wt % to about 50 wt % of a floor material before curing or its flooring product. In some embodiments, an ionomer is in a range of 4 wt % to about 10 wt %. In some embodiments, an ionomer is less than 5 wt %. In some embodiments, an ionomer is about 1 wt %, about 2 wt %, about 4 wt %, about 5 wt %, about 10 wt %, about 15 wt %, about 20 wt %, about 25 wt %, about 30 wt %, about 35 wt %, about 40 wt %, about 45 wt % and about 50 wt %. In some embodiments, an ionomer is in a range of any two of the above values.

Fillers

Almost every conceivable material can be added as a filler to rubber in attempts to cheapen and stiffen it. A filler, selected from the group consisting of limestone, zinc oxide, silica, mica, baryte, dolomite, calcium carbonate, clay, alumina trihydrate and any combination thereof, can be added to flooring materials in accordance with the present invention. Fillers can be virgin or from recycling. Exemplary virgin fillers include mineral fillers such as limestone, zinc oxide, silica, mica, barytes, dolomite, clays or carbon black. Heavy weight fillers include metal particles, such as powdered tungsten. Exemplary recycled fillers include limestone, wood flower, glass or gypsum.

In accordance with the present invention, the content of a filler or the total content when a filler comprises combination of different fillers, in some embodiments, is in a range of about 20 wt % to about 75 wt % of a floor material before curing or its flooring product. In some embodiments, the content of a filler or the total content is in a range of about 50 wt % to about 75 wt %. In some embodiments, the content of a filler or the total content is about 60 wt %, about 61 wt %, about 62 wt %, about 63 wt %, about 64 wt %, about 65 wt %, about 66 wt %, about 67 wt %, about 68 wt %, about 69 wt %, or about 70 wt %. In some embodiments, the content of the content of a filler or the total content is in a range of about any two values above. In some embodiments, limestone is used in accordance with the present invention. Limestone is ground calcium/magnesium carbonate and is usually composed of calcite and/or aragonite. Its inexpensiveness makes it one of the most widely used filler in the industry. Suitable limestone in accordance with the present invention can be obtained in a variety of particle sizes usually varying from 0.02 μm to 30 μm. Limestone particles of 0.02 μm to 0.4 μm obtained from precipitation methods are used in some embodiments.

In some embodiments, recycled glass is used as a filler to increase to recycling content of the floor material; recycled glass could come from post-industrial or post-consumer sources; average particle size may varies from less than 1 μm to 100 μm.

In some embodiments, clay and/or calcium carbonate is used in accordance with the present invention. Clays and calcium carbonates are natural mineral deposits that are mined, crushed or ground, and separated into fractions by particle size. Clays are typically separated in two classes: hard and soft clay. Hard clays usually have a small particle size providing good physical properties.

In some embodiments, silica is used as a filler. Without being bound to any particular theory, it is generally believed that silica raises the elastic modulus of materials (e.g., rubber flooring materials). It may confer remarkable toughness, especially resistance to abrasion, on otherwise weak materials such as SBR. As used herein, the term "silica" refers to an agent based on silicon dioxide (silica), silicates and mixtures thereof. The term silica is used for conciseness of description only and should not be construed to limit the description or claims to silicon dioxide only. In various embodiments, silica can be in the form of particles having a size between about 10 nm and about 20 microns.

Curing Systems

As appreciated by ordinary skill in the art, vulcanization is a chemical process for converting rubber or related polymers into more durable material via the addition of sulfur or other curing systems. An important ingredient in the provided flooring material is a curing system that causes interlinking reactions to take place when the material is cured to prepare its flooring product. In general, a curing system includes, but is not limited to, sulfur systems, peroxides, urethane crosslinkers, metallic oxides, etc.

Many traditional rubber flooring materials/products employ a sulfur-based curing system. A sulfur-based curing system, in some embodiments, contains sulfur and one or more "accelerators" (e.g., sulfenamides, thiurams, or thiazoles), which make the sulfur interlinking reaction occur faster and more efficiently. Other ingredients that play an important role in vulcanization chemistry are known as "activators," commonly zinc oxide and stearic acid. Such activators can react together and with an accelerator to form a zinc sulfur complex, which in turn is the key intermediary in adding sulfur to a diene elastomer and creating sulfur interlinks.

Alternatively or additionally, a curing system contains an agent other than sulfur. In some embodiments, a curing system in accordance with the present invention, contains no sulfur systems. In some embodiments, a curing system contains a peroxide.

A peroxide can be defined to be a compound containing a peroxide group, i.e., an oxygen-oxygen single bond or the peroxide anion. Peroxides generally decompose on heating to form radicals, which extract hydrogen from groups on the polymer molecules. Carbon radicals formed in this way on different molecules then combine to create carbon-carbon interlinks. Without being bound to any particular theory, it is believed that products with C—C interlinks are more resistant to heat and oxidative attack, and also their strength is higher but elasticity is lower than products with sulfur interlinks.

Peroxides can be used in accordance with the present invention contains organic and/or inorganic peroxides. Exemplary groups of organic peroxides include, but are not limited to the Trigonox and Perkadox families of compounds available from Akzo Nobel, Arnhem, The Netherlands, respectively. Exemplary organic peroxides include, but are not limited to, cyclic peroxides, diacyl peroxides, dialkyl peroxides, dicumyl peroxide, hydroperoxides, peroxycarbonates, peroxydicarbonates, dimyristyl peroxydicarbonate, di cetyl peroxydicarbonate, diisopropyl peroxydicarbonate, peroxyesters, and peroxyketals.

Exemplary cyclic peroxides include, but are not limited to, 3,6,9-triethyl-3,6,9-trimethyl-1,4,7-triperoxonane, and 3,3,5,7,7-Pentamethyl-1,2,4-trioxepane. Such cyclic peroxides, for example, are commercially available under the tradename Trigonox 301, and Trigonox 311 from Akzo Nobel, Arnhem, The Netherlands.

Exemplary diacyl peroxides include, but are not limited to, di(3,5,5-trimethylhexanoyl)peroxide. Such diacyl peroxides, for example, are commercially available under the tradename Trigonox 36, from Akzo Nobel, Arnhem, The Netherlands.

Exemplary dialkyl peroxides include, but are not limited to, 2,5-dimethyl-2,5-di(tert-butylperoxy)hexane; 2,5-dimethyl-2,5-di(tert-butylperoxy)hexyne-3; di-tert-amyl peroxide; di-tert-butyl peroxide; tert-butyl cumyl peroxide, and di(terbutyl peroxyisopropyl)benzene. Such dialkyl peroxides, for example, are commercially available under the trade names Trigonox 101, Trigonox 145, Trigonox 201, Trigonox B, Trigonox T and Perkadox 14-40 from Akzo Nobel, Arnhem, The Netherlands.

Exemplary hydroperoxides include, but are not limited to, tert-Amyl hydroperoxide; and 1,1,3,3-tetramethylbutyl hydroperoxide. Such hydroperoxides, for example, are commercially available under the tradenames Trigonox TAHP, and Trigonox TMBH, from Akzo Nobel, Arnhem, The Netherlands.

Exemplary peroxycarbonates include, but are not limited to, tert-butylperoxy 2-ethylhexyl carbonate; tert-amylperoxy 2-ethylhexyl carbonate; and tert-butylperoxy isopropyl carbonate. Such peroxycarbonates, for example, are commercially available under the trade names Trigonox 117, Trigonox 131, and Trigonox BPIC, from Akzo Nobel, Arnhem, The Netherlands.

Exemplary peroxydicarbonates include, but are not limited to, di(2-ethylhexyl) peroxydicarbonates; di-sec-butyl peroxydicarbonates and di(4-tert-butylcyclohexyl) peroxydicarbonate. Such peroxydicarbonates, for example, are commercially available under the trade name Trigonox EHP, Trigonox SBP, and Perkadox 16 from Akzo Nobel, Arnhem, The Netherlands.

Exemplary peroxyesters include, but are not limited to, tert-amyl peroxy-2-ethylhexanoate; tert-amyl peroxyneodecanoate; tert-amyl peroxypivalate; tert-amyl peroxybenzoate; tert-amyl peroxyacetate; 2,5-dimethyl-2,5-di(2-ethylhexanoylperoxy)hexane; tert-butyl peroxy-2-ethylhexanoate; tert-butyl peroxyneodecanoate; tert-butyl peroxyneoheptanoate; tert-butyl peroxypivalate; tert-butyl peroxydiethylacetate; tert-butyl peroxyisobutyrate; 1,1,3,3-tetramethylbutyl peroxy-2-ethylhexanoate; 1,1,3,3-tetramethylbutyl peroxyneodecanoate; 1,1,3,3-tetramethylbutyl peroxypivalate; tert-butyl peroxy-3,5,5-trimethylhexanoate; cumyl peroxyneodecanoate; tert-butyl peroxybenzoate; and tert-butyl peroxyacetate. Such peroxyesters, for example, are commercially available under the trade names Trigonox 121; Trigonox 123; Trigonox 125; Trigonox 127; Trigonox 133; Trigonox 141; Trigonox 21; Trigonox 23; Trigonox 257; Trigonox 25; Trigonox 27; Trigonox 41; Trigonox 421; Trigonox 423; Trigonox 425; Trigonox 42; Trigonox 99; Trigonox C; and Trigonox F, from Akzo Nobel, Arnhem, The Netherlands.

Exemplary peroxyketals include, but are not limited to, 1,1-di(tert-amylperoxy)cyclohexane; 1,1-di(tert-butylperoxy)cyclohexane; 1,1-di(tert-butylperoxy)-3,3,5-trimethylcyclohexane; 2,2-di(tert-butylperoxy)butane and butyl 4,4-di (tert butylperoxy)valerate. Such peroxyketals, for example, are commercially available under the tradenames Trigonox 122, Trigonox 22, Trigonox 29, Trigonox D, and Trigonox 17 from Akzo Nobel, Arnhem, The Netherlands.

Other examples for organic peroxides include, but are not limited to, diacyl peroxides, dicumyl peroxide (e.g., Perkadox BC-40K-PD), dimyristyl peroxydicarbonate (e.g., Perkadox 26), di cetyl peroxydicarbonate (e.g., Perkadox 24L), and diisopropyl peroxydicarbonate (e.g., Perkadox IPP).

In some embodiments, a curing system contains a peroxide and a coagent. Coagents are used with peroxides to adjust cure rate, improve the efficiency of cure, increase crosslink density; also act as plasticizers in improving processability during mixing.

A coagent suitable for use in accordance with the present invention can be multifunctional acrylic or acrylate products or high vinyl polymers. Exemplary coagents include, but are not limited to, SR-516, SR-517, SR-519 (from Sartomer), Ricon 150 (from Cray Valley).

Amount of a curing system in a flooring material according to the present invention before curing and/or after curing is of important. In some embodiments, a curing system is about less than 1 wt % of a flooring material and/or its flooring product. In some embodiments, a curing system is in a range of about 0.1 wt % to about 5 wt %. In some embodiments, a curing system is in a range of about 0.25 wt % to about 5 wt %. In some embodiments, a curing system is in a range of about 0.25 wt % to about 3 wt %. In some embodiments, a curing system is in a range of about 0.25 wt % to about 2 wt %.

In certain embodiments, a curing system contains a peroxide in a range of about 0.1 wt % to about 5 wt % of a flooring material and/or its flooring product. In certain embodiments, a curing system contains a peroxide in a range of about 0.25 wt % to about 5 wt %. In certain embodiments, a curing system contains a peroxide in a range of about 0.25 wt % to about 2 wt %.

In certain embodiments, a curing system contains also a coagent in a range of about 0.1 wt % to about 5 wt % of a flooring material and/or its flooring product. In certain embodiments, a curing system contains a coagent in a range of about 0.25 wt % to about 5 wt %. In certain embodiments, a curing system contains a coagent in a range of about 0.25 wt % to about 2 wt %.

Processing Aids

In general, a chemical which is added to rubber or plastic materials to improve workability during fabrication to extend or modify the natural properties of these materials or to develop new improved properties not present in the original material. In various embodiments, a flooring material in accordance with the present invention includes processing aids, to facilitate imparting various properties to the resultant flooring materials as well as mechanical and workability characteristics of the materials before or during curing.

In some embodiments, plasticizers (e.g., resins) are added to a flooring material in order to soften and plasticize the material, either in processing or later in use. For example, elastomers with high glass transition temperatures (and correspondingly slow molecular motions) can be improved by adding low-temperature plasticizers—i.e., compatible liquids that act as internal lubricants. Examples of suitable plasticizers include paraffinic oils such as Sunpar products from R.E. Carroll, Inc. (e.g., Sunpar 150, Sunpar 2280, etc.). Alternatively or additionally, others, such as a petroleum oil, can be added to a flooring material as processing aids in order to make mixing and extrusion easier. In certain embodiments, disflamoll TOF (trioctyl phosphate), is used in accordance with the present invention as a flame retardant with plasticizing properties.

In some embodiments, a processing aid is a mixture of light aliphatic resin and fatty acid derivatives. Commercially available materials such as Struktol W80, Struktol WB 42, Struktol EF-44, Struktol RP-28 (from Struktol) can be of use in accordance with the present invention. In some embodiments, a processing aid comprises a resin selected from the group consisting of hydrocarbon (such as aliphatic hydrocarbon), vinyl copolymer, phenol formaldehyde based resins, and any combination thereof. Exemplary resins can be Nevtac 99

(from Nevchem), Eastotac C-100W (from Eastman), SP-1077 (from SI Group), Piccotex LC resin (from Eastman).

Color Components

In various embodiments, a flooring material in accordance with the present invention includes one or more color components. A color component can be a material of any form, in any shape, and with any patterns, which has a color. A colorant including, but not limited to, a dye, a pigment, a biological pigment, an ink, a paint, a colored chemical, etc, can be used as a color component. Alternatively or additionally, a strip or chip of color, or any material/composite with colors can be used.

A pigment can be an inorganic material, an organic material or their combination. Exemplary pigments include, but are not limited to, red, yellow, or brown iron oxide (e.g., Red RB 2097, Mapico 1075, Brun B-135), titanium Dioxide (e.g., $TiO_2$ 2073), chrome oxide (e.g., Green G-4099), phtalocyanine green (e.g., Green Hostassin GG), phtalocyanine blue (e.g., Hostassin Blue A2R), Dianisidine orange (e.g., Irgalite orange Mor), Diarylide Yellow (e.g., Permanent Yellow G11-1101), Monoazo/Benzimidazolone Red (e.g., Carmin Graphtol HF4C, Red Hostassin HF2B), Monoazo/Benzimidazolone Violet (e.g., Bordeaux PV HF3R Novoperm).

Additional Components

Additional components can be added to flooring materials in accordance with the present invention. Examples include, but are not limited to, curing agents, lubricants, anti-stick agents, working adjuvants, age-retarding agents, flame-retarding agents, protective chemicals such as protective waxes (e.g., paraffinic waxes, polyethylene glycol, etc.). In some embodiments, by using a peroxide curing system in accordance with the present invention, some protective chemicals may not be necessary. For example, antioxidants (such as antiozonants) may not be necessary in some embodiments.

In some embodiments, phosphorous flame retardants such as aliphatic or aromatic phosphate based compounds are used. Examples include, but are not limited to, Disflamoll DPK, Disflamoll TKP, Disflamoll TP, Disflamoll DPO, Disflamoll TOF (from LanXESS).

Preparation

Provided flooring materials in the present inventions can be prepared using rubber processing techniques known to those skilled in the art using standard rubber processing equipment. For example, a wide variety of machines and methods can be used to mix and cure flooring materials in accordance with the present invention.

General processing may include steps of mixing and curing.

In some embodiments, mastication and softening are performed before mixing a flooring material. As well understood by ordinary skill in the art, these operations are usually carried out in batches either in large enclosed mixing machines or on rubber mills. A preeminent example of an enclosed machine is the Banbury (registered trademark) mixer. In some embodiments, mixing is carried out on machines similar to those used in mastication, sometimes immediately after softening.

In some embodiments, a curing system is incorporated during mixing. In other embodiments, a curing system is added at the end of mixing, in order to minimize the risk of premature cure.

In some embodiments, shaping occurs after mixing and before curing a flooring material. A step of shaping can be performed, for example, by extrusion, molding, calendering, etc. Extruders can be used to prepare flooring products from flooring materials in accordance with the present invention. They are used in general to produce long continuous products or various profiles that can later be cut to length. Calenders can be used to make wide sheeting. In some embodiments, shaping is done by calendering a flooring material under conditions that do not cure the material to form a sheet. In transfer and injection molds, a flooring material is forced through channels into a mold chamber of the required shape, where it is cured under pressure.

Typically, curing is carried out under a pressure in a tool (e.g., a press a mold, etc.), which are heated by steam or thermal oil or electricity to temperatures at which the interlinking reaction takes place. Cure conditions can be several minutes or seconds at an elevated temperature. In some embodiments, an elevated temperature is in a range of about 220° F. to about 380° F. In some embodiments, an elevated temperature is in a range of about 240° F. to about 320° F. In some embodiments, an elevated temperature is about 340° F. to about 380° F. In some embodiments, an elevated temperature is about 340° F. to about 400° F. In some embodiments, an elevated temperature is about 220° F., about 230° F., about 240° F., about 250° F., about 260° F., about 270° F., about 280° F., about 290° F., about 300° F., about 310° F., about 320° F., about 330° F., about 340° F., about 350° F., about 360° F., about 370° F., about 380° F., about 390° F., about 400° F. In some embodiments, an elevated temperature is in a range of about any two values above.

In some embodiments, an electric radiant heater is heated of about 500° F. to 800° F. to cure a flooring material.

In general, processes for preparing a flooring product from a flooring material, including mixing and/or curing, are carried out under a pressure greater than 1 atm, or at near-atmospheric pressure. Operation pressures can vary at different steps and/or during one step of the processes. In some embodiments, a pressure is in a range of about 40 psi to about 2000 psi. Depending to desired physical properties of the result flooring product, different pressures are used. In certain embodiments, a pressure is in a range of about 40 psi to about 100 psi. With being bound to any particle theory, it is believed that a pressure range of about 40 psi to about 100 psi is suitable for making a sheet. In certain embodiments, a pressure is in a range of about 500 psi to about 2000 psi. With being bound to any particle theory, it is believed that a pressure range of about 500 psi to about 2000 psi is suitable for making a tile.

Products and Use

Provided flooring materials in the present invention after curing product flooring products. Such a flooring product is substantially planar and resilient. In various embodiments, provided flooring products exhibit typical characteristics of resilient flooring products such as rubber sheet floor covering, rubber floor tile, etc. Standard specification and test methods are described in ASTM F 1344 (for rubber floor tile), ASTM F 1859 (for rubber sheet floor), and ASTM F 1514, the contents of each of which are incorporated herein by reference.

Desired properties of a flooring product prepared from a flooring material in accordance with the present invention may depend on factors such as weight percentages, size, quality of various components, and processes and conditions for preparation of such components.

For example, different pressures are used to make flooring products in accordance with the present invention. In some embodiments, a pressure is in a range of about 40 psi to about 100 psi to make a sheet. In some embodiments, a pressure is in a range of about 500 psi to about 2000 psi to make a tile.

Proportions of polymers and other components can influence various characteristics of a flooring material and its resulting flooring product, for example, tensile, modulus, elongation, tear, duro (i.e., hardness), density, indentation, heat stability, UV stability, etc. Such characteristics of a flooring product can also be adjusted by the processes and conditions in which a flooring material is prepared and fabricated.

In some embodiments, tensile of a flooring product in accordance with the present application is in a range of about 500 psi to about 1600 psi. In some embodiments, tensile of a flooring product is in a range of about 500 psi to about 1500 psi. In some embodiments, tensile of a flooring product is in a range of about 520 psi to about 1500 psi. In some embodiments, tensile of a flooring product is in a range of about 520 psi to about 1035 psi. In some embodiments, tensile of a flooring product is in a range of about 785 psi to about 1500 psi. In some embodiments, tensile of a flooring product is in a range of about 785 psi to about 1035 psi. In some embodiments, tensile of a flooring product is about 785 psi, about 865 psi, about 960 psi, about 950 psi, about 900 psi, about 520 psi, about 910 psi, about 760 psi, about 1030 psi, about 1035 psi, about 1230 psi, about 1235 psi, about 1240 psi, about 1245 psi, about 1250 psi, about 1255 psi, about 1260 psi, about 1265 psi, about 1270 psi, about 1275 psi, about 1280 psi, about 1290 psi, or about 1230 psi. In some embodiments, tensile of a flooring product is in a range of any two values above.

In some embodiments, modulus (10%) of a flooring product in accordance with the present application is in a range of about 300 psi to about 1500 psi. In some embodiments, modulus (10%) s of a flooring product is in a range of about 505 psi to about 700 psi. In some embodiments, modulus (10%) of a flooring product is in a range of about 725 psi to about 1030 psi. In some embodiments, modulus (10%) of a flooring product is about 1000 psi, about 1050 psi, about 1055 psi, about 1060 psi, about 1065 psi, about 1070 psi, about 1075 psi, about 1080 psi, about 1085 psi, about 1090 psi, about 1095 psi, about 1100 psi, about 1105 psi, about 1110 psi, about 1115 psi, about 1120 psi, about 1125 psi, about 1130 psi, about 1135 psi, about 1140 psi, about 1145 psi, or about 1150 psi. In some embodiments, modulus (10%) of a flooring product is in a range of any two values above.

In some embodiments, elongation of a flooring product in accordance with the present application is in a range of about 25% to about 220%. In some embodiments, elongation of a flooring product is in a range of about 115% to about 205%. In some embodiments, elongation of a flooring product is about 185%, about 150%, about 140%, about 125%, about 205%, about 135%, about 190%, about 115%, about 110%, about 105%, about 100%, about 95%, about 90%, about 85%, about 80%, about 75%, about 70%, about 65%, about 60%,. In some embodiments, elongation of a flooring product is in a range of any two values above.

In some embodiments, tear of a flooring product in accordance with the present application is in a range of about 150 lb/inch to about 225 lb/inch. In some embodiments, tear of a flooring product is in a range of about 150 lb/inch to about 200 lb/Po. In some embodiments, tear of a flooring product is in a range of about 160 lb/inch to about 190 lb/Po. In some embodiments, tear of a flooring product is about 150 lb/inch, about 155 lb/inch, about 160 lb/inch, about 165 lb/inch, about 170 lb/inch, about 175 lb/inch, about 180 lb/inch, about 185 lb/inch, about 190 lb/inch, about 195 lb/inch, about 200 lb/inch, about 205 lb/inch, about 210 lb/inch, about 215 lb/inch, about 220 lb/inch, or about 225 lb/inch. In some embodiments, tear of a flooring product is in a range of any two values above.

In some embodiments, density of a flooring product in accordance with the present application is in a range of about 1.2 g/cm$^3$ to about 2.0 g/cm$^3$. In some embodiments, density of a flooring product is about 1.20 g/cm$^3$, about 1.30 g/cm$^3$, about 1.40 g/cm$^3$, about 1.50 g/cm$^3$, about 1.60 g/cm$^3$, about 1.65 g/cm$^3$, about 1.66 g/cm$^3$, about 1.67 g/cm$^3$, about 1.68 g/cm$^3$, about 1.69 g/cm$^3$, about 1.70 g/cm$^3$, about 1.80 g/cm$^3$, about 1.90 g/cm$^3$, or about 2.00 g/cm$^3$. In some embodiments, density of a flooring product is in a range of any two values above.

In some embodiments, specific gravity of a flooring product as compared to water density in accordance with the present application is in a range of about 1.2 to about 2.0. In some embodiments, specific gravity of a flooring product is about 1.20, about 1.30, about 1.40, about 1.50, about 1.60, about 1.65, about 1.66, about 1.67, about 1.68, about 1.69, about 1.70, about 1.80, about 1.90, or about 2.00. In some embodiments, specific gravity of a flooring product is in a range of any two values above.

Test method ASTM 1514 can be used for determining the resistance of flooring products to color change from exposure to elevated temperature over a specified period of time. The color change is measured with a spectrophotometer with light sources such as cool white fluorescent (CWF) and daylight light (D-65) according to test method ASTM D 2244. When tested in accordance with test methods, the color change of a flooring product shall have an average ΔE. In some embodiments, an average ΔE of a flooring product in accordance with the present invention is significantly less than that of a standard (e.g., containing a sulfur based curing system) flooring product under the same test condition.

In some embodiments, a flooring product with a light color in accordance with the present invention has advantages in color stability. Typically, a white or beige material can be used for color analysis. One of ordinary skill will recognize that the color change is dependent upon the initial color, e.g. a black material can exhibit very little or no color change In some embodiments, an average ΔE of a flooring product is in a range of about 0.5 to about 3.5 when heat resistance is measured by spectrophotometer after aging at the temperature of 350° F. for 30 minutes. In some embodiments, an average ΔE of a flooring product is in a range of about 2 to about 3, when heat resistance is measured by spectrophotometer after aging at the temperature of 350° F. for 30 minute. In some embodiments, an average ΔE of a flooring product is about 0.4, about 0.5, about 0.6, about 0.7, about 0.8, about 0.9, about 1.0, about 1.1, about 1.2, about 1.3, about 1.4, about 1.5, about 1.6, about 2.3, about 2.5, about 2.6, about 2.7, about 2.8, about 3, about 3.1, or about 3.5 when heat resistance is measured by spectrophotometer after aging at the temperature of 350° F. for 30 minute. In some embodiments, an average ΔE of a flooring product is in a range of any two values above, when heat resistance is measured by spectrophotometer after aging at the temperature of 350° F. for 30 minute.

Test method ASTM F 1515, using a Xenon Arc light apparatus, can be used to perform light stability; color change is measured according to test method ASTM D 2244. In some embodiments, an average ΔE of a flooring product is in a range of about 1 to about 5 when light resistance is measured by spectrophotometer after aging at the temperature of 145° F. for 300 hours. In some embodiments, an average ΔE of a flooring product is in a range of about 2 to about 3 when heat resistance is measured by spectrophotometer after aging at the temperature of 145° F. for 300 hours. In some embodiments, an average ΔE of a flooring product is about 0.5, about 1.1, about 2.1, about 2.7, about 3, about 3.3, about 3.8, about 3.9, about 4.6, or about 5, when heat resistance is measured by spectrophotometer after aging at the temperature of 145° F. for 300 hours. In some embodiments, an average ΔE of a flooring product is in a range of any two values above when heat resistance is measured by spectrophotometer after aging at the temperature of 145° F. for 300 hours.

EXAMPLES

Aspects of the present inventions may be further understood in light of the following examples, which are not exhaustive and which should not be construed as limiting the scope of the present inventions in any way.

Example 1

In this Example, limestone was added as a filler. Additionally or alternatively, alumina trihydrate can be used. In some embodiments, an exemplary composition of fillers comprises or consists of limestone and alumina trihydrate. For example, fillers can comprise alumina trihydrate of about 8 wt % (of total formulation). Exemplary formulations of a flooring material and/or a flooring product according to the invention are presented in Table 1:

TABLE 1

| Material | Example 1 | Example 2 | Example 3 | Example 4 | Example 5 |
|---|---|---|---|---|---|
| EPDM/EPM | 16% | 22% | 20% | 20% | 18% |
| LDPE | | | 6% | | |
| Octene-Ethylene copolymer | | 8% | | | |
| Ionomer | 4% | | 5% | 10% | 4% |
| High styrene resin | 5% | | | | |
| Styrene-Acrylate copolymer | | | | | 5% |
| Filler (limestone) | 68% | 63% | 65% | 65% | 67% |
| Processing aids (resin) | 4% | 4% | 1% | 2% | 3% |
| Color package (TiO₂) | 2% | 2% | 2% | 2% | 2% |
| Peroxide curing system | 1% | 1% | 1% | 1% | 1% |

Flooring material's properties, for example, color stability, were measured substantially in accord with the following standards. Heat resistance was measured in color change by spectrophotometer at the temperature of 350° F. for 30 minutes, whereas light resistance was measured in color change by spectrophotometer at the temperature of 145° F. for 300 hours.

TABLE 2

| | Standard rubber flooring | New rubber flooring |
|---|---|---|
| Heat resistance (ΔE) | ΔE: 18 | ΔE: 3 |
| Light resistance (ΔE) | ΔE: 10 | ΔE: 2 |

Example 2

As discussed above, flooring materials and/or products in accordance with the present invention can utilize one or more fillers. In this Example, silica was used as a filler in addition to limestone. Without being bound to any particular theory, silica facilitates hardening and cleaning the surface of a flooring material and/or a flooring product in according to the invention. Recycled glass was added as well. In some embodiments, an exemplary composition of fillers comprises or consists of limestone, recycled glass, silica and alumina trihydrate. For example, fillers can comprise or consist of limestone of 47.4 wt % (of total formulation), recycled glass of 10.5 wt % (of total formulation), silica of 2.6 wt % (of total formulation) and alumina trihydrate of 7.9 wt % (of total formulation).

Exemplary formulations of a flooring material and/or a flooring product are presented in Table 3:

TABLE 3

| Material | Example 1 | Example 2 | Example 3 | Example 4 | Example 5 |
|---|---|---|---|---|---|
| EPDM/EPM | 16% | 22% | 20% | 20% | 18% |
| LDPE | | | 6% | | |
| Octene-Ethylene copolymer | | 8% | | | |
| Ionomer | 4% | | 5% | 10% | 4% |
| High styrene resin | 5% | | | | |
| Styrene-Acrylate copolymer | | | | | 5% |
| Filler (limestone) | 67% | 62% | 64% | 64% | 66% |
| Processing aids (resin) | 4% | 4% | 1% | 2% | 3% |
| Color package (TiO₂) | 2% | 2% | 2% | 2% | 2% |
| Peroxide curing system | 2% | 2% | 2% | 2% | 2% |

Flooring material's properties, for example, color stability, were measured substantially in accord with the following standards. Heat resistance was measured in color change by spectrophotometer after aging at the temperature of 350° F. for 30 minutes, whereas light resistance was measured in color change by spectrophotometer after aging at the temperature of 145° F. for 300 hours.

TABLE 4

| | Standard rubber flooring | New rubber flooring |
|---|---|---|
| Heat resistance (ΔE) | ΔE: 10 | ΔE: 1 |
| Light resistance (ΔE) | ΔE: 10 | ΔE: 2 |

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present inventions have been described in conjunction with various embodiments and examples, it is not intended that the present inventions be limited to such embodiments or examples. On the contrary, the present inventions encompass various alternatives, modifications, and equivalents, as will be appreciated by those of skill in the art.

While the inventions have been particularly shown and described with reference to specific illustrative embodiments, it should be understood that various changes in form and detail may be made without departing from the spirit and scope of the present inventions. Therefore, all embodiments that come within the scope and spirit of the present inventions, and equivalents thereto, are claimed.

What is claimed is:

1. A flooring material, comprising:
   between about 1 wt % to about 50 wt % a polyolefin-based elastomer material;
   between about 2 wt % to about 50 wt % a polyolefin-based thermoplastic material comprising an ionomer;
   between about 20 wt % to about 75 wt % a filler; and
   between about 0.1 wt % to about 5 wt % a curing system containing a peroxide.

2. The flooring material of claim 1, wherein the curing system is the peroxide.

3. The flooring material of claim 1, wherein the curing system is or comprises the peroxide and a coagent.

4. The flooring material of claim 1, wherein the curing system is in a range of about 0.25 wt % to about 3 wt %.

5. The flooring material of claim 1, wherein the peroxide is in a range of about 0.25 wt % to about 2 wt %.

6. The flooring material of claim 1, wherein the coagent is in a range of about 0.25 wt % to about 2 wt %.

7. The flooring material of claim 1, wherein the polyolefin-based elastomer material is selected from the group consisting of ethylene-propylene rubber (EPR), ethylene-propylene-diene rubber(EPDM), ethylene-acrylic rubber and any combinations thereof.

8. The flooring material of claim 1, wherein the polyolefin-based thermoplastic material is selected from the group consisting of low density polyethylene(LDPE), ionomer, acid copolymer, acrylate copolymer, ethylene-octene copolymer, styrene-acrylate copolymer, styrene-methylacrylate block copolymer, styrene-polyolefin block copolymer and any combinations thereof.

9. The flooring material of claim 1, wherein the ionomer is less than about 5 wt %.

10. The flooring material of claim 1, wherein the filler is selected from the group consisting of limestone, zinc oxide, silica, mica, baryte, dolomite, calcium carbonate, clay, alumina trihydrate and any combination thereof.

11. The flooring material of claim 1, further comprising a high styrene resin.

12. A flooring product cured from a flooring composition comprising:
  between about 1 wt % to about 50 wt % a polyolefin-based elastomer material;
  between about 2 wt % to about 50 wt % a polyolefin-based thermoplastic material comprising an ionomer;
  between about 20 wt % to about 75 wt % a filler; and
  between about 0.1 wt % to about 5 wt % a curing system containing a peroxide.

13. The flooring product of claim 12, the flooring material is characterized by a density in a range of about 1.2 g/cm$^3$ to about 2.0 g/cm$^3$.

14. The flooring product of claim 12, the flooring material is characterized by a tensile in a range of about 500 psi to about 1600 psi.

15. The flooring product of claim 12, the flooring material is characterized by a modulus (10%) in a range of about 300 psi to about 1500 psi.

16. The flooring product of claim 12, the flooring material is characterized by elongation in a range of about 25% to about 220%.

17. The flooring product of claim 12, the flooring material is characterized by tear in a range of about 150 lb/inch to about 225 lb/inch.

18. The flooring product of claim 12, an average ΔE of the flooring product is in a range of about 0.5 to about 3.5 when heat resistance is measured by spectrophotometer after aging at the temperature of 350° F. for 30 minutes.

19. The flooring product of claim 12, an average ΔE of the flooring product is in a range of about 1 to about 5 when light resistance is measured by spectrophotometer after aging at the temperature of 145° F. for 300 hours.

20. A method for making a flooring product comprising steps of:
  combining between about 1 wt % to about 50 wt % a polyolefin-based elastomer material;
    between about 2 wt % to about 50 wt % a polyolefin-based thermoplastic material comprising an ionomer;
    between about 20 wt % to about 75 wt % a filler; and
    between about 0.25 wt % to about 5 wt % a curing system containing a peroxide
    so that into a flooring material is provided;
  exposing the flooring material to conditions sufficient to achieve curing of the flooring product.

* * * * *